US010487893B2

(12) United States Patent
Malmassari et al.

(10) Patent No.: US 10,487,893 B2
(45) Date of Patent: Nov. 26, 2019

(54) MULTILAYER PAD FOR A DISC BRAKE

(71) Applicant: FRENI BREMBO S.P.A., Curno, Bergamo (IT)

(72) Inventors: Cristian Malmassari, Curno (IT); Andrea Cerutti, Curno (IT); Luca Maestrini, Curno (IT)

(73) Assignee: Freni Brembo S.P.A., Curno, Bergamo (IT)

( * ) Notice: Subject to any disclaimer, the term of this patent is extended or adjusted under 35 U.S.C. 154(b) by 56 days.

(21) Appl. No.: 15/555,200

(22) PCT Filed: Feb. 26, 2016

(86) PCT No.: PCT/IB2016/051055
§ 371 (c)(1),
(2) Date: Sep. 1, 2017

(87) PCT Pub. No.: WO2016/139562
PCT Pub. Date: Sep. 9, 2016

(65) Prior Publication Data
US 2018/0051759 A1    Feb. 22, 2018

(30) Foreign Application Priority Data
Mar. 4, 2015    (IT) .............................. BG2015A0013

(51) Int. Cl.
F16D 65/04    (2006.01)
F16D 65/095    (2006.01)
(Continued)

(52) U.S. Cl.
CPC ....... F16D 65/095 (2013.01); F16D 65/0006 (2013.01); F16D 65/092 (2013.01);
(Continued)

(58) Field of Classification Search
CPC ..... F16D 2069/0441; F16D 2069/0433; F16D 69/0408; F16D 2069/005; F16D 65/0006
See application file for complete search history.

(56) References Cited

U.S. PATENT DOCUMENTS 3,490,563 A    1/1970 Hahm
4,103,761 A    8/1978 Filderman
(Continued)

FOREIGN PATENT DOCUMENTS

FR    2265009 A1    10/1974
WO    02/12747 A1    2/2002

OTHER PUBLICATIONS

Machine-generated English Translation of FR2265009, obtained via Espacenet.
(Continued)

Primary Examiner — Nicholas J Lane
(74) Attorney, Agent, or Firm — Marshall & Melhorn, LLC

(57) ABSTRACT

A pad for a disc brake has a support plate and a friction material. The support plate has at least one first plate and at least one second plate. The first plate is a single-piece and has a flat piston support surface suitable for facing at least one thrust device. The first plate also has a first friction surface opposite the piston support surface and is at least partially suitable for facing the friction material. The at least one second plate is suitable for being interposed between the at least one first plate and the friction material. The at least one second plate is connected to the first plate in a plurality of junction points which are separate from one another. The at least one second plate extends over at least one portion of the friction surface of the at least one first plate delimited by a single closed perimeter.

10 Claims, 6 Drawing Sheets

Figure 1:
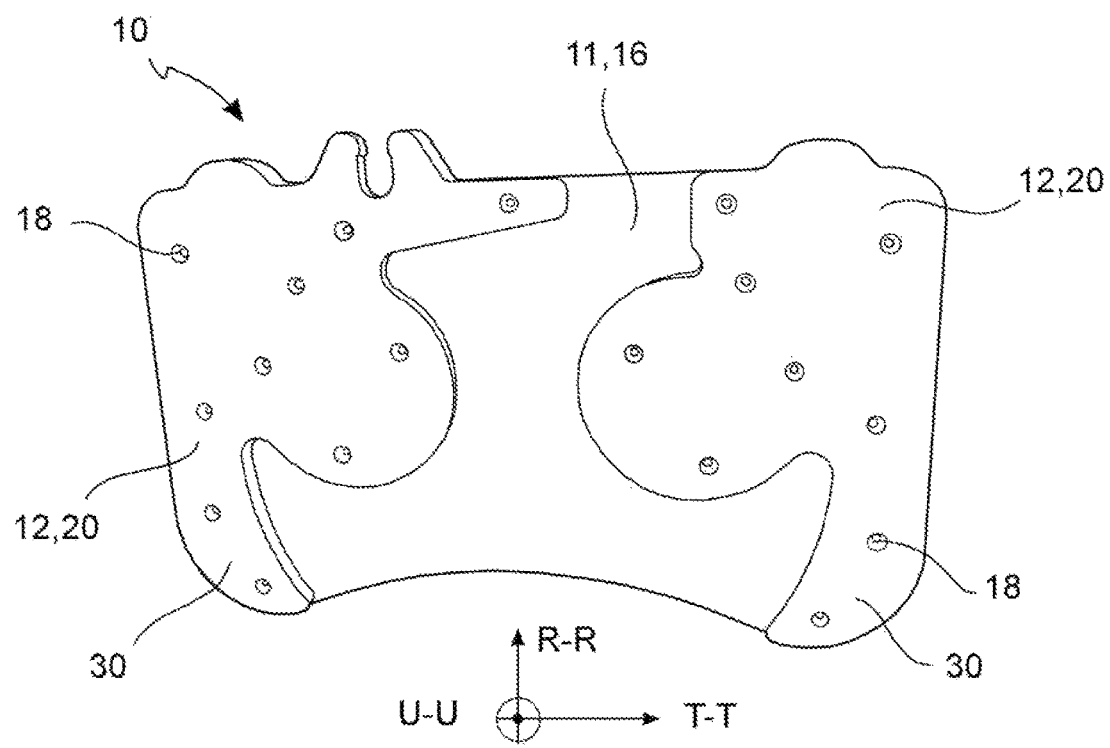

(51) Int. Cl.
*F16D 65/00* (2006.01)
*F16D 65/092* (2006.01)
*F16D 69/04* (2006.01)

(52) U.S. Cl.
CPC ...... *F16D 69/0408* (2013.01); *F16D 65/0068* (2013.01); *F16D 2069/0441* (2013.01)

(56) References Cited

U.S. PATENT DOCUMENTS

| | | |
|---|---|---|
| 5,515,950 A | 5/1996 | Kwolek |
| 6,230,857 B1 * | 5/2001 | Ciriello ................. B65H 23/06 188/250 E |
| 6,405,840 B1 | 6/2002 | Foster et al. |

OTHER PUBLICATIONS

International Search Report of International Appln. No. PCT/IB2016/051055 (dated Feb. 26, 2016).

* cited by examiner

MULTILAYER PAD FOR A DISC BRAKE

FIELD OF THE INVENTION

The present invention relates to a pad for a disc brake for motor vehicles.

In particular, the present invention relates to a multiple layer pad for a disc brake, with anti-rattling and anti-drumming effect.

For example, rattling and noise may be caused by the vibrations generated during the braking action, which is exerted by the disc brake calliper by means of thrust means, piston-cylinder units, which exert a thrust on friction elements, typically pads for a disc brake, against a braking surface of the disc of a disc brake. Vibrations with maximum amplitude may be localized in the less restrained, and therefore more free to move, areas of the pads generally positioned far from the application point of the thrust. Moreover, vibrations may arise, under conditions of contact between the pad and disc of a disc brake, for example from the transition between dynamic and static friction phenomena, or "stick-slip" phenomena.

BACKGROUND ART

For example, International Patent Application No. WO02/12747 by the same Applicant shows a multiple layer pad for a disc brake in which the support plate of the friction material is made on two layers, or levels, which are integrated into a single rigid plate body, obtained by molding.

Such a solution allows the friction material to be firmly anchored to the support plate due to the addition of mass in the form of a layer buried in the friction material of the pad under conditions of use.

Document U.S. Pat. No. 3,490,563A discloses a multiple layer pad in which an opening is obtained in all layers of the support plate of the friction material, and the thrust force exerted e.g. by a piston is distributed by means of the edges of such openings which are not aligned with one another.

Document U.S. Pat. No. 4,103,761A discloses a multiple layer pad which comprises a multiple layer support plate, and such layers of the plate are connected to one another by means of welding points.

Such a solution allows the relative sliding of the layers forming the plate, which may therefore vibrate in independent manner from one another, thus dampening the vibrations.

Document U.S. Pat. No. 6,405,840B1 discloses a multiple layer pad comprising a meshed or netted metallic layer for reinforcing the structure of the support plate of the friction material.

The solution described above allows the friction material to flow inside the holes of the metal mesh or net, thus improving the coupling of the friction material to the plate.

Although such solutions are advantageous, they do not completely meet the contrasting needs of obtaining a multiple layer pad comprising a support plate of the friction material capable of dampening the vibrations, firmly anchoring to the friction material and being compatible with disc brake calliper products which precede the invention and already on the market.

Solution

It is the object of the present invention to obviate the drawbacks of the prior art and to provide a solution to the contrasting needs of providing a pad for a disc brake capable of providing an adequate dampening of the vibrations, ensuring the anchoring between friction material and the support plate, and that is compatible with disc brake callipers available on the market prior to the prevent invention.

These and other objects are achieved by a pad for a disc brake according to claim 1, and also by a disc brake calliper according to claim 11.

Certain advantageous embodiments are the subject of the dependent claims.

DRAWINGS

Figure 2:
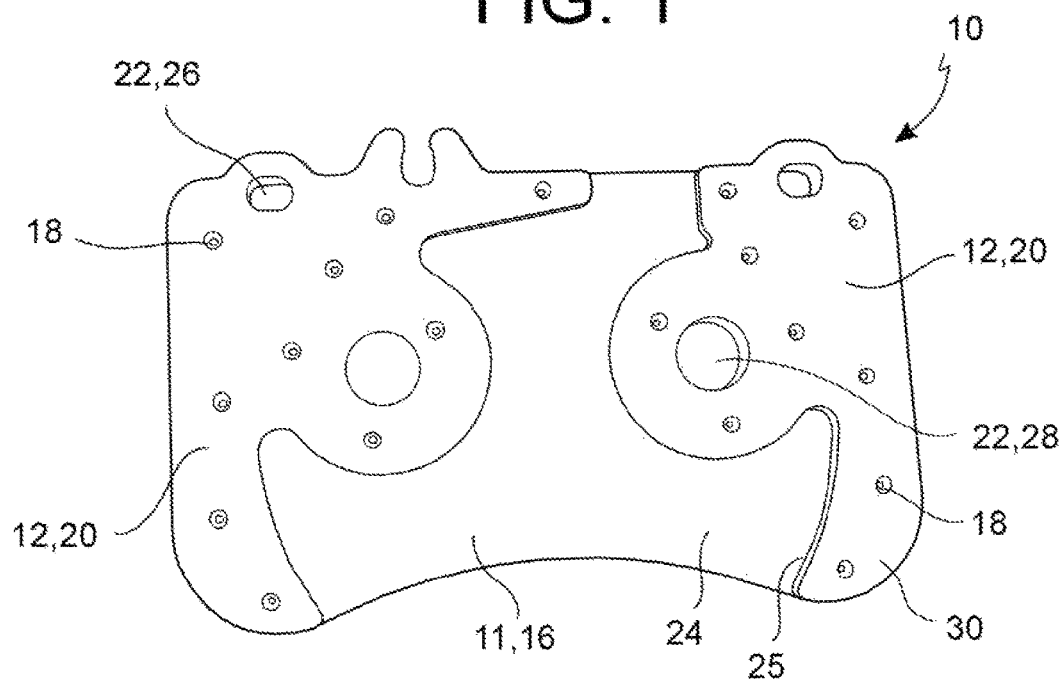
Figure 3:
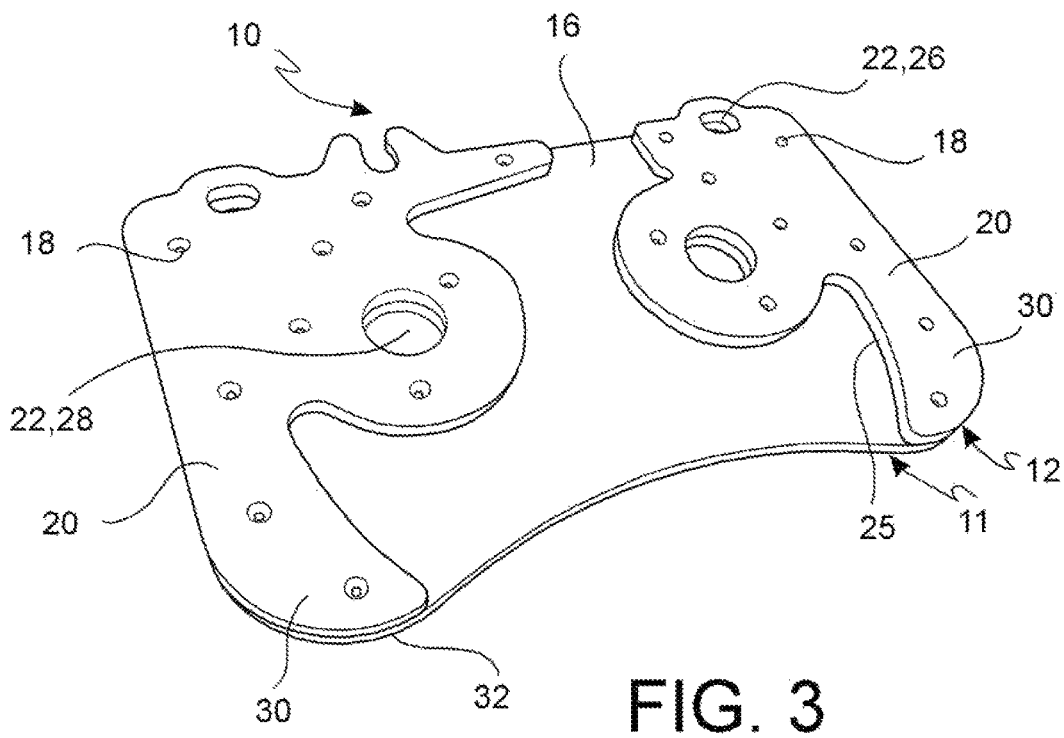
Figure 4:
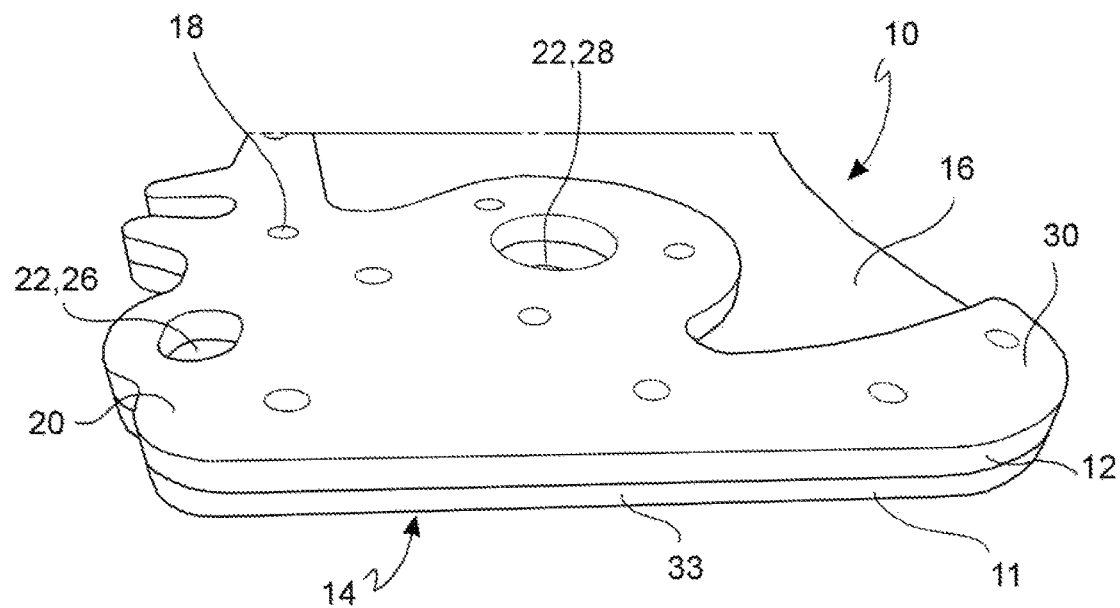
Figure 5:
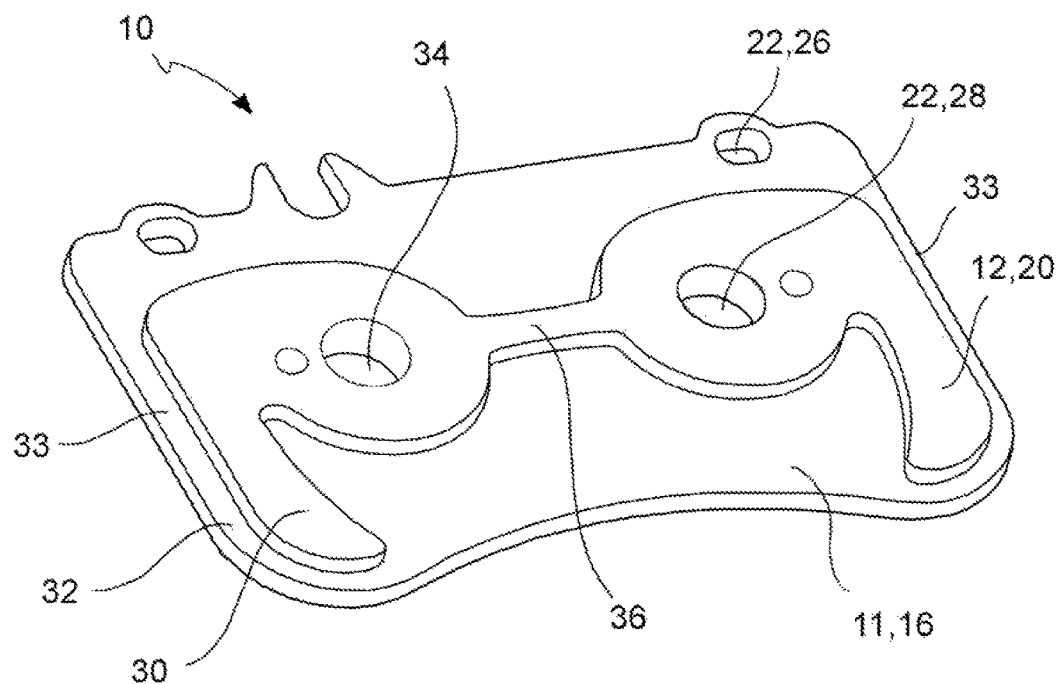
Figure 6:
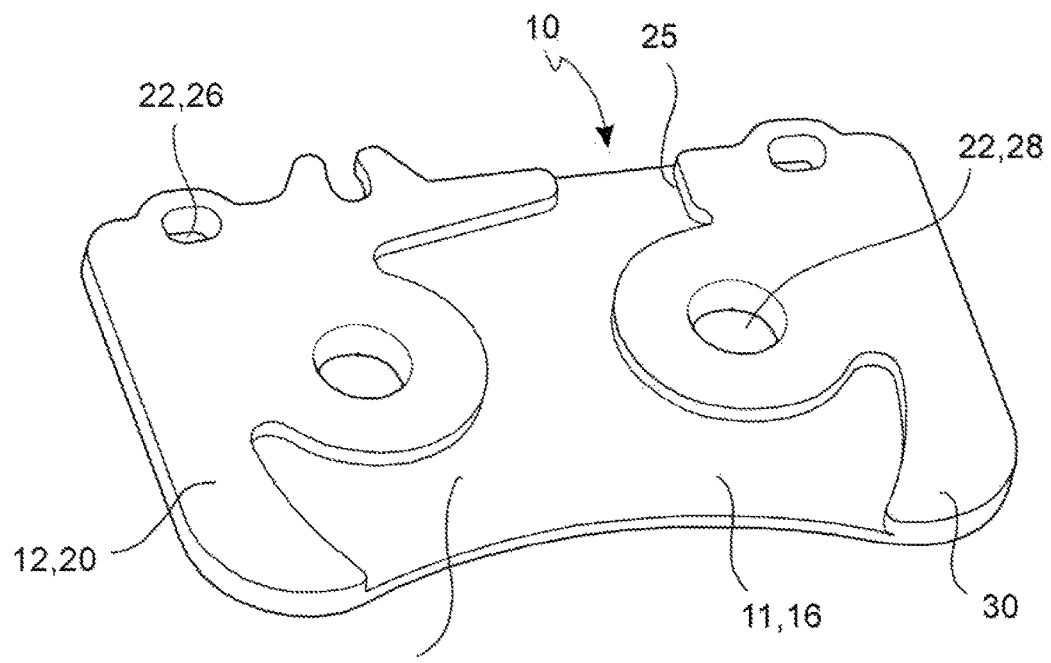
Figure 7:
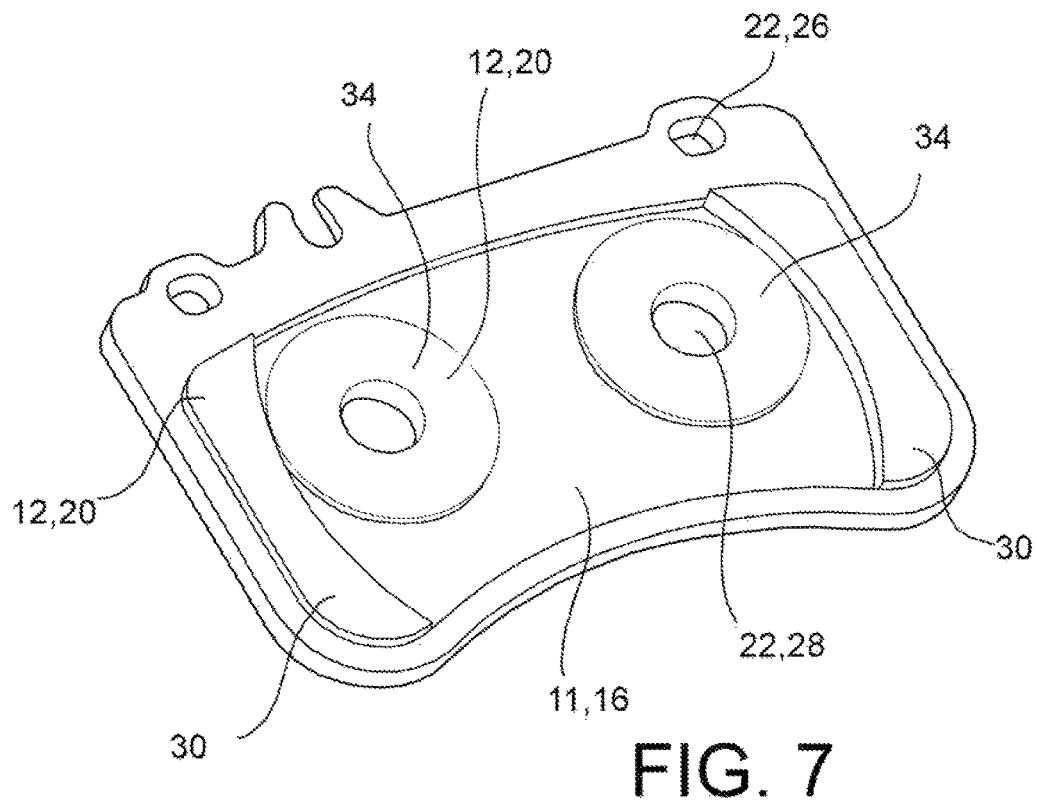
Figure 8:
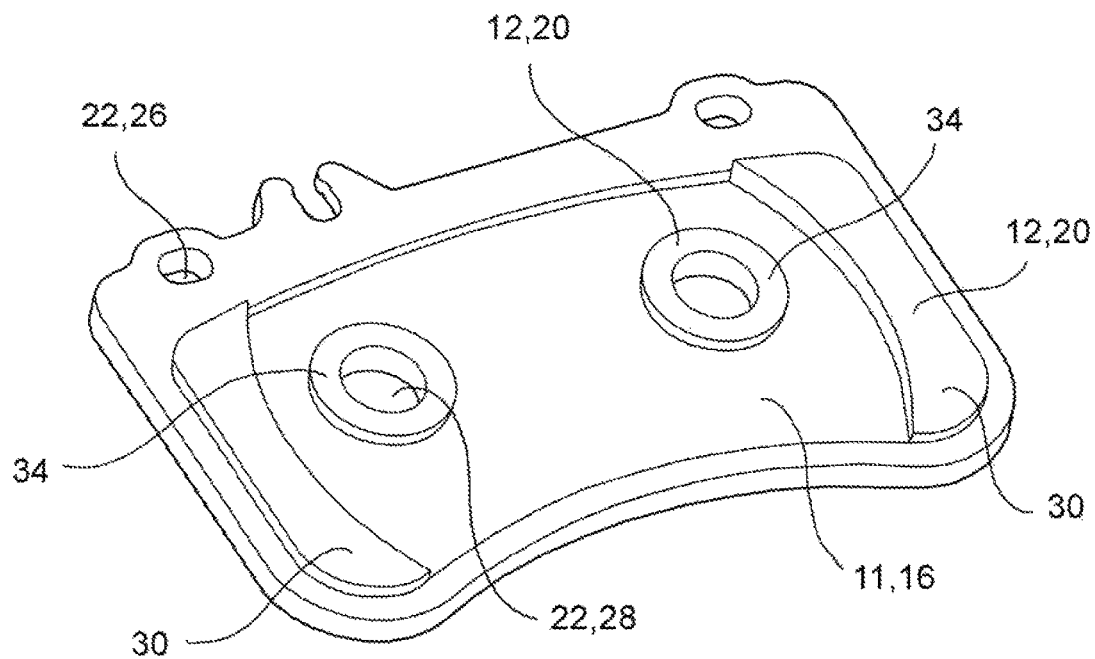
Figure 9:
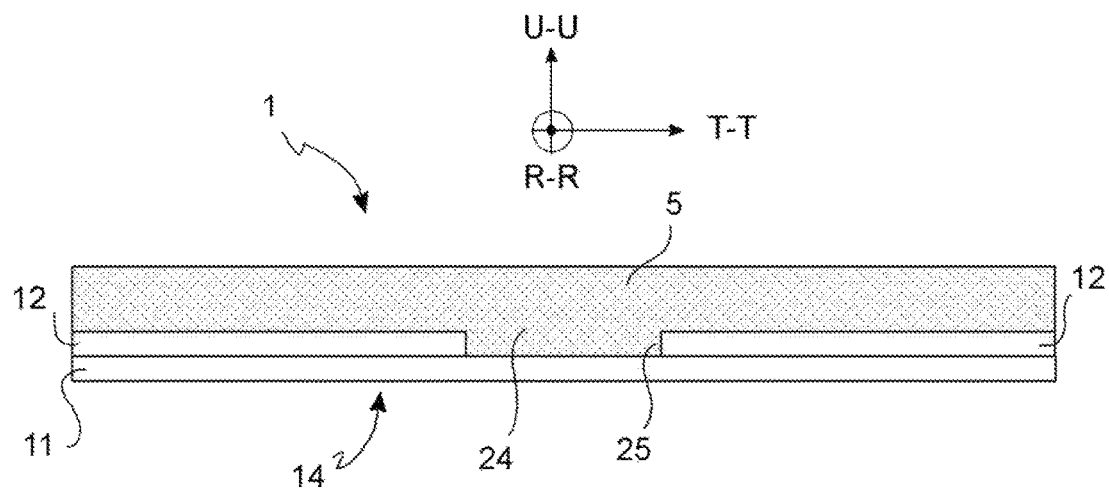
Figure 10:
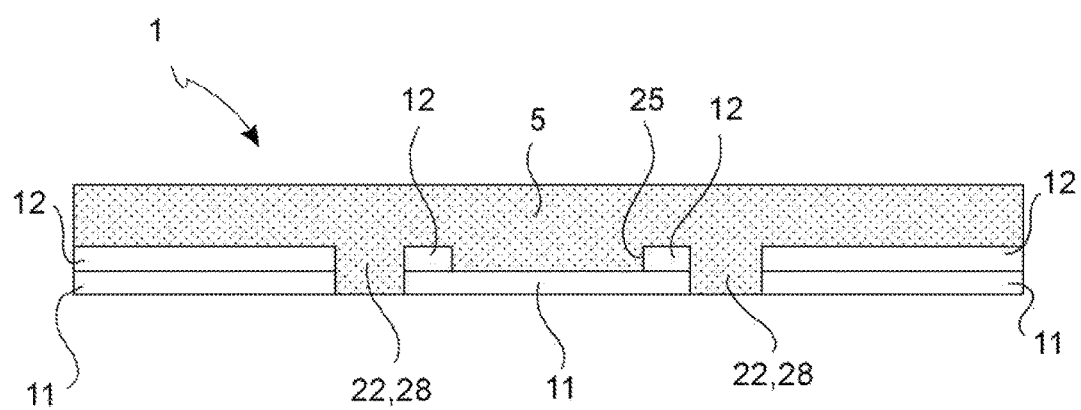
Figure 11:
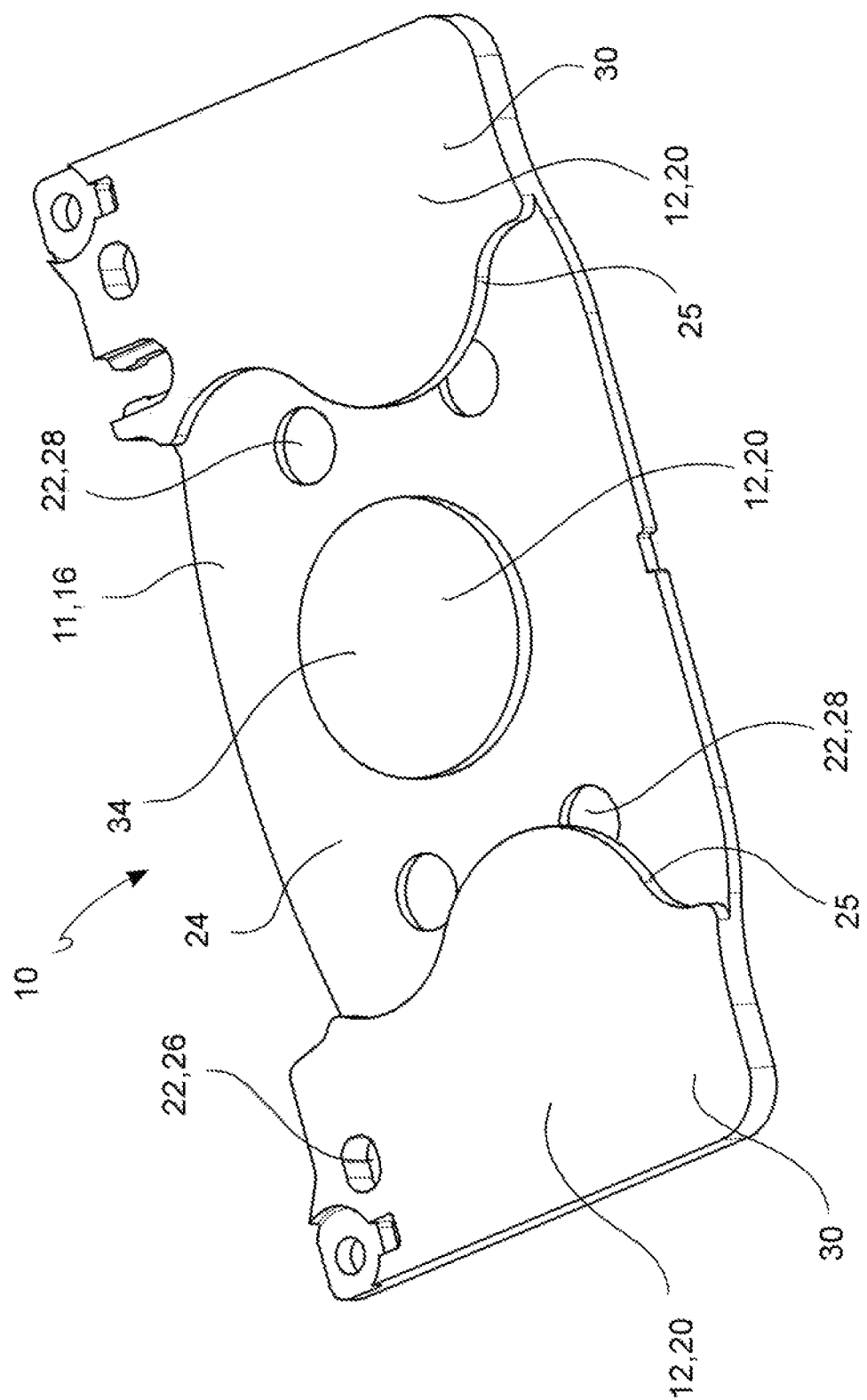

Further features and advantages of the equipment according to the invention will appear in the description below of its preferred, non-limiting example embodiments, with reference to the accompanying drawings, in which:

FIG. 1 is a view in the lying plane of a support plate of a pad for a disc brake according to the invention, FIG. 2 is a view in the lying plane of a support plate of a pad for a disc brake according to one embodiment variant of the invention, FIG. 3 is a perspective view of a support plate of a pad for a disc brake according to one embodiment variant of the invention shown in FIG. 2, FIG. 4 is a perspective view of a portion of a support plate of a pad for a disc brake according to one embodiment variant of the invention shown in FIGS. 2 and 3, FIG. 5 is a perspective view of a support plate of a pad for a disc brake according to a further embodiment variant of the invention, FIG. 6 is a perspective view of a support plate of a pad for a disc brake according to a further embodiment variant of the invention, FIG. 7 is a perspective view of a support plate of a pad for a disc brake according to a further embodiment variant of the invention, FIG. 8 is a perspective view of a support plate of a pad for a disc brake according to a further embodiment variant of the invention, FIG. 9 is a diagrammatical sectional view of a pad for a disc brake comprising the support plate shown in FIG. 1, FIG. 10 is a diagrammatical sectional view of a pad for a disc brake comprising the support plate shown in FIG. 2, FIG. 11 is a perspective view of a support plate of a pad for a disc brake according to a further embodiment variant of the invention.

DESCRIPTION OF SOME PREFERRED EMBODIMENTS

The elements or parts of elements common to the embodiments described below will be indicated using the same numeral.

With reference to the figures, numeral 1 generally indicates a pad for a disc of a disc brake.

Under conditions of use, that is when pad 1 is mounted on a disc brake calliper body and is facing an associable brake disc, a radial direction R-R is defined passing through the center of rotation of a brake disc associated with a pad 1 and through any one of the points belonging to the braking band of the brake disc, and a tangential T-T or circumferential direction is defined which is orthogonal to said radial direction R-R; moreover, an axial direction U-U is defined which is orthogonal to both the radial direction R-R and the tangential direction T-T.

A pad 1 for a disc brake comprises a support plate 10 and a friction material 5, in which said pad 10 mainly extends in a plane defined, when plate 10 is in use, by the radial direction R-R and the tangential direction T-T, which define a lying plane that can face a disc of a disc brake.

Said support plate 10 comprises at least one first plate 11 and at least one second plate 12, in which said first plate 11 is in single-piece and extends over a region of said lying plane which defines the footprint of pad 1 in said lying plane, and in which said first plate comprises a flat piston support surface 14 suitable for facing at least one thrust means, and a first friction surface 16 opposite to the piston support surface 14 and at least partially suitable for facing the friction material 5.

In accordance with one embodiment, said piston support surface 14 is flat and smooth and is made in single-piece. This advantageously allows the pressures transferred from said at least one thrust means to be distributed to pad 1.

In accordance with one embodiment, said at least one thrust means may be e.g. a hydraulically or electrically actuated piston.

Said at least one second plate 12 is suitable for being interposed between said at least one first plate 11 and the friction material 5 and said at least one second plate 12 is connected to the first plate 11 in a plurality of junction points 18 which are separate from one another.

Advantageously, said plurality of junction points 18 are separate from one another, thus allowing said at least one first plate 11 and said at least one second plate 12 to vibrate independently of each other and thus allowing free portions of said at least one first plate and said at least one second plate 12 to move, for example to bend, relative to one another and therefore to dampen the vibrations induced by the braking.

In accordance with one embodiment, said plurality of junction points 18 are separate from one another and may be uniformly distributed on the surface of said second plate 12.

In accordance with one embodiment variant, said junction points 18 are separate from one another and may be randomly distributed on the surface of said second plate 12.

Said plurality of junction points 18 may be in the shape of a plurality of welding points or rivets or threaded connections.

In accordance with one embodiment, said at least one first plate 11 and said at least one second plate 12 have a different thickness, that is an extension in axial direction U-U.

In accordance with one embodiment, said at least one first plate 11 and said at least one second plate 12 have a substantially equal thickness, that is an extension in axial direction U-U.

In accordance with one embodiment, said at least one first plate 11 and said at least one second plate 12 are made of a metal material, such as e.g. steel, stainless steel, cast iron, aluminum or aluminum alloy, and said plurality of junction points 18 is a plurality of capacitive welding points.

Said at least one second plate 12 extends over at least one portion of the friction surface 16 of said at least one first plate 11 delimited by a single closed perimeter, in which at least one portion of the friction surface 16 of said at least one first plate 11 is external to said closed perimeter of said at least one second plate 12 and faces said friction material 5, and said at least one second plate 12 defines a second friction surface 20 facing the friction material 5, which is continuous.

Advantageously, said at least one second plate 12 which extends over at least one portion of the friction surface 16 of said at least one first plate 11 allows the mass and/or rigidity of the support plate 10 to be locally modified, and therefore the own vibration frequency of pad 1 to be modified.

Generally, said at least one second plate 12 is designed so as to allow pad 1 to vibrate at a low frequency, or at a lower frequency than known solutions, thus generating an anti-rattling effect.

Advantageously, the size of the shape of the first plate 11 makes pad 1 compatible with disc brake callipers existing prior to the invention and available on the market for some time; this allows pads which are obsolete, both due to wear and design, to be replaced with new pads in accordance with the present invention.

In accordance with one embodiment, said second friction surface 20 is devoid of openings that expose the friction material 5 directly to said first friction surface 16.

In accordance with one embodiment, said second friction surface 20 is free from openings inside said single closed perimeter, which openings allow said friction material 5 to be put into communication with said first friction surface 16 inside said closed perimeter.

In accordance with one embodiment variant, said second continuous friction surface 20 is interrupted inside said single closed perimeter only by at least one through opening 22 which crosses either said at least one second plate 12 and said at least one first plate 11 and/or by recesses in said at least one second plate 12 at said plurality of junction points 18.

In accordance with one embodiment, said openings may be e.g. slots 26 for accommodating pins, or cooling holes 28.

Said second plate 12 extends over the first plate 11 so as to delimit a seat 24 suitable for accommodating the friction material 5 and in which at least one portion of said friction material 5 is accommodated and geometrically coupled in such a seat 24.

Advantageously, said seat 24 suitable for accommodating the friction material 5 allows said friction material 5 to firmly grip the support plate 10 and therefore to resist the stresses deriving from the braking action while coupled.

In accordance with one embodiment, said second plate 12 comprises at least one stiffening rib 30 which extends along a curved edge 32 of the first plate 11.

In accordance with one embodiment variant, at least one stiffening rib 30 extends along a radial edge 33 of said first plate, that is an edge which extends along the edges of the plate which are parallel to the radial direction R-R.

It is apparent from an analysis made by the inventors that the portions of edges 32, 33, particularly but not exclusively the portions of radial edge 33, of the support plate 10 are the portions most stressed by the vibrations in terms of amplitude of the movements.

Therefore, when said at least one stiffening rib 30 is positioned along a curved edge 32 or along a radial edge 33 of said first plate 11, it advantageously allows the mass and the rigidity of the support plate 10 to be locally modified in the areas of edge 32, 33, thus dampening the vibrations of pad 1 caused by the braking action and modifying precisely the vibration frequency of pad 1.

Advantageously, said at least one stiffening rib 30 positioned along a radial edge 33 of said first plate 11 allows the friction material 5 to grip to a side 25 of said second plate 12 which delimits said seat 24, even more firmly, during the tangential stresses, that is in the direction parallel to T-T, which occur during the braking action.

Said side 25 indeed cooperates with said friction material 5 to affect the friction material in tangential direction, that is parallel to T-T.

In accordance with one embodiment, said second plate 12 comprises at least one stiffening island 34.

In accordance with one embodiment variant, said second plate 12 comprises at least two separate stiffening islands 34.

In accordance with a further embodiment variant, said at least two stiffening islands 34 are connected by means of at least one bridge portion 36 of said at least one second plate 12.

In accordance with one embodiment variant, said at least one second plate 12 comprises said second continuous friction surface 20, in which said second continuous friction surface 20 is interrupted inside said single closed perimeter by at least one through opening 22 which crosses either said at least one second plate 12 and said at least one first plate 11, and in which said first friction surface 16 is interrupted by through holes 22, such as for example cooling holes 28, positioned in portions of said first plate 11 suitable for facing said friction material 5, i.e. external to said closed perimeter of said second plate 12.

Those skilled in the art, in order to meet contingent needs and specifications, may make several changes, adaptations and substitutions of elements with others which are functionally equivalent to the above-described embodiments, without departing from the scope of the following claims.

LIST OF REFERENCES 1. pad
5. friction material
10. support plate
11. first plate
12. second plate
14. flat piston support surface
16. friction surface
18. junction points
20. second friction surface
22. through opening
24. seat for the friction material
25. side
26. slot
28. cooling hole
30. stiffening rib
32. curved edge
33. radial edge
34. stiffening island
36. bridge portion
R-R. radial direction
T-T. tangential direction
U-U. axial direction

The invention claimed is:

1. A pad for a disc brake comprising a support plate and a friction material, wherein said pad extends in a plane defined, when the plate is in use, by a radial direction (R-R) and a tangential direction (T-T), which define a lying plane that can face a disc of the disc brake, and wherein said support plate comprises at least one first plate and at least one second plate, wherein said first plate is a single-piece and extends over a region of said lying plane which defines the overall dimensions of the pad in said lying plane, and wherein said first plate comprises a flat piston support surface suitable for facing at least one thrust device, and a first friction surface opposite the piston support surface and at least partially suitable for facing the friction material, and wherein said at least one second plate is suitable for being interposed between said at least one first plate and the friction material, and wherein said at least one second plate is connected to the first plate in a plurality of junction points separate from one another, wherein said at least one second plate extends on at least one portion of the friction surface of said at least one first plate delimited by a single closed perimeter, at least one portion of the friction surface of said at least one first plate is external to said closed perimeter of at least one second plate and is in direct facing contact with said friction material, wherein said at least one second plate defines a second friction surface facing said friction material, wherein said second friction surface is continuous;

wherein said at least one second plate comprises two stiffening ribs that extend along a curved edge of the first plate, wherein said friction material is bounded between said two stiffening ribs.

2. The pad according to claim 1, wherein said second friction surface is devoid of openings that expose the friction material directly to said first friction surface; and/or wherein said second friction surface is devoid of openings internal to said single closed perimeter which allow to put in communication said friction material with said first friction surface inside said closed perimeter; and/or wherein said second continuous friction surface is interrupted internally to said single closed perimeter only by at least one through opening which crosses both said at least one second plate and said at least one first plate and/or by recesses to said at least one second plate at said plurality of junction points.

3. The pad according to claim 1, wherein said at least one first plate is shaped to be used with brake calipers.

4. The pad according to claim 1, wherein said at least one second plate extends on said at least one first plate in such a way as to delimit a seat suitable for accommodating the friction material and wherein within which seat at least one portion of said friction material is accommodated and geometrically coupled.

5. The pad according to claim 1, wherein said at least one second plate comprises at least one stiffening portion.

6. The pad according to claim 1, wherein said at least one second plate comprises at least two separate stiffening portions.

7. The pad according to claim 6, wherein said at least two stiffening portions are connected by at least one bridge portion of said at least one second plate.

8. The pad according to claim 1, wherein said at least one first plate and said at least one second plate are made of metal material.

9. The pad according to claim 8, wherein said plurality of junction points is obtained by capacitive welding.

10. A disc brake caliper comprising at least one pad for a disc brake, said pad comprising a support plate and a friction material, wherein said pad extends in a plane defined, when the plate is in use, by a radial direction (R-R) and a tangential direction (T-T), which define a lying plane that can face a disc of a disc brake, and wherein said support plate comprises at least one first plate and at least one second plate, wherein said first plate is a single-piece and extends over a region of said lying plane which defines the overall dimensions of the pad in said lying plane, and wherein said first plate comprises a flat piston support surface suitable for facing at least one thrust device, and a first friction surface opposite the piston support surface and at least partially suitable for facing the friction material, and wherein said at least one second plate is suitable for being interposed between said at least one first plate and the friction material, and wherein said at least one second plate is connected to the first plate in a plurality of junction points separate from one another, wherein said at least one second plate extends on at least one portion of the friction surface of said at least one first plate delimited by a single closed perimeter, at least one portion of the friction surface of said at least one first plate is external to said closed perimeter of at least one second plate and is in direct facing contact with said friction material, wherein said at least one second plate defines a second friction surface facing said friction material, wherein said second friction surface is continuous;

wherein said at least one second plate comprises two stiffening ribs that extend along a curved edge of the first plate, wherein said friction material is bounded between said two stiffening ribs.

* * * * *